United States Patent
Morita et al.

(10) Patent No.: US 8,442,385 B2
(45) Date of Patent: May 14, 2013

(54) CUT POINT DETECTION SYSTEM AND SHORT RECOGNITION SYSTEM USING THE SAME, CUT POINT DETECTION METHOD AND CUT POINT DETECTION PROGRAM

(75) Inventors: Hiroyoshi Morita, Tokyo (JP); Fumihiro Inoue, Tokyo (JP); Yasuo Masaki, Osaka (JP); Hirono Tsubota, Osaka (JP)

(73) Assignees: The University of Electro-Communications, Tokyo (JP); Funai Electric Co., Ltd., Osaka (JP)

( * ) Notice: Subject to any disclaimer, the term of this patent is extended or adjusted under 35 U.S.C. 154(b) by 1438 days.

(21) Appl. No.: 11/702,433

(22) Filed: Feb. 5, 2007

(65) Prior Publication Data

US 2008/0037949 A1 Feb. 14, 2008

(30) Foreign Application Priority Data

Aug. 3, 2006 (JP) .................................. 2006-211746

(51) Int. Cl.
*G11B 27/00* (2006.01)

(52) U.S. Cl.
USPC .......................................... 386/279; 386/239

(58) Field of Classification Search ........................ None
See application file for complete search history.

(56) References Cited

U.S. PATENT DOCUMENTS

| | | | | |
|---|---|---|---|---|
| 5,642,174 A * | 6/1997 | Kazui et al. | ..................... | 348/700 |
| 6,473,459 B1 * | 10/2002 | Sugano et al. | ........... | 375/240.16 |
| 2004/0091044 A1 * | 5/2004 | Nakajima et al. | ........ | 375/240.01 |
| 2004/0131331 A1 * | 7/2004 | Kim et al. | ........................ | 386/68 |
| 2004/0179597 A1 * | 9/2004 | Rault | ........................ | 375/240.08 |
| 2005/0104971 A1 * | 5/2005 | Pilu | ........................... | 348/208.99 |

FOREIGN PATENT DOCUMENTS

| | | |
|---|---|---|
| JP | 2001-313956 | 11/2001 |
| JP | 2004-180299 A | 6/2004 |
| JP | 2005-505165 T | 2/2005 |

OTHER PUBLICATIONS

Patent Abstracts of Japan for Japanese Publication No. 2001-313956, Publication Date Nov. 9, 2001 (2 pages).
Aoki et al.; "Cut Detection in MPEG2 Compressed Data Using Macro Type Block", Information Processing Society of Japan, Collected papers: Computer Vision and Image Media, vol. 46, No. SIG15 (CVIM12), pp. 51-58, Oct. 2005.
Office Action issued in corresponding Japanese Patent Application No. 2006-211746; Dated Nov. 16, 2010 and English translation thereof (2 pages).

* cited by examiner

*Primary Examiner* — William C Vaughn, Jr.
*Assistant Examiner* — Eileen Adams
(74) *Attorney, Agent, or Firm* — Osha Liang LLP

(57) ABSTRACT

The MBT information for each frame is extracted from the moving picture compressed data containing the MBT information, an MBT symbol string is created by obtaining the frequency at which a specific MBT is contained from the extracted MBT information for each frame, appending a predetermined MBT symbol to each frame in accordance with its frequency feature, and arranging the MBT symbols according to the frame order, the cut point of the moving picture is discriminated from an array feature of MBT symbols in the MBT symbol string, and further a shot is identified based on an estimation model using the MBT symbol string.

12 Claims, 11 Drawing Sheets

FIG. 4
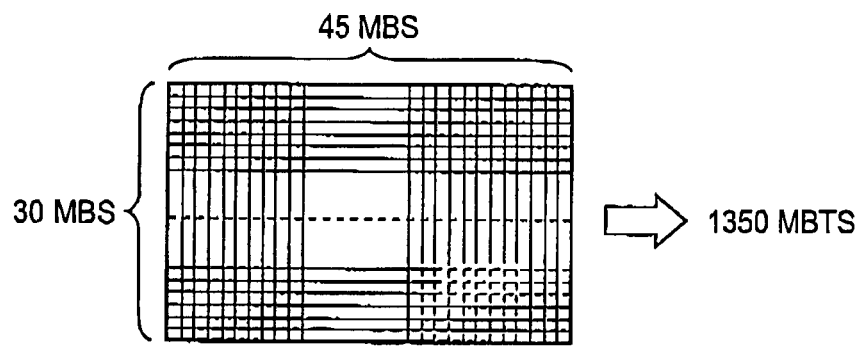
NUMBER OF MBS FOR EACH TYPE IN ONE FRAME
mbIntra: INTRA CODING MBT
mbForward: FORWARD PREDICTIVE CODING MBT
mbBack: BACKWARD PREDICTIVE CODING MBT
mbInter: BI-DIRECTIONAL PREDICTIVE CODING MBT
mbOther: OTHER CODING MBT
CREATION OF MBT SYMBOL STRING

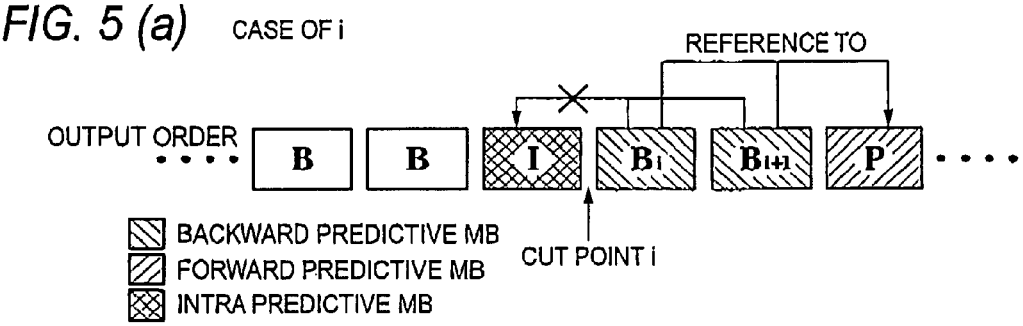
FIG. 5 (a) CASE OF i
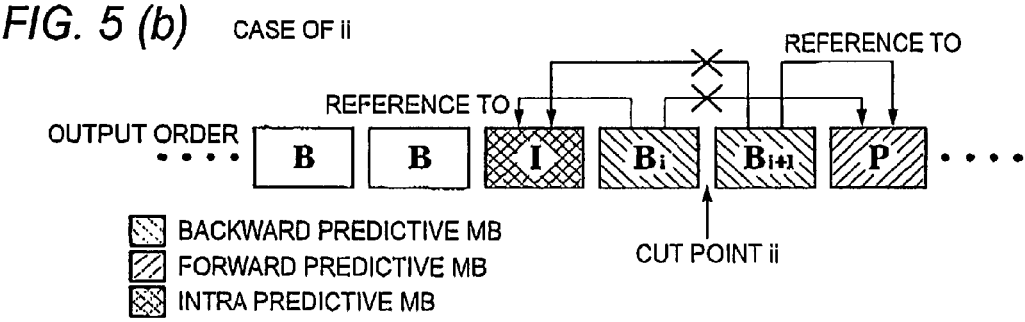
FIG. 5 (b) CASE OF ii
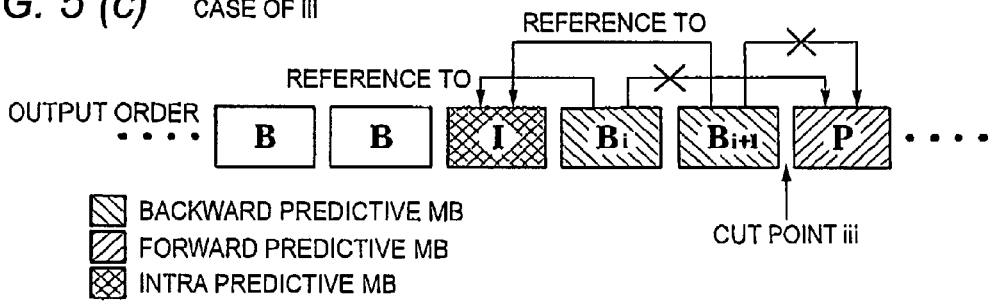
FIG. 5 (c) CASE OF iii

FIG. 7

| GIVEN SYMBOL | CONDITIONS |
|---|---|
| 0 | B FRAME, MOST FREQUENT mbForward AND (mbBack + mbInter) < t |
| 1 | B FRAME, MOST FREQUENT mbForward AND (mbBack + mbInter) ≥ t |
| 2 | B FRAME, MOST FREQUENT mbBack AND (mbForward + mbInter) < t |
| 3 | B FRAME, MOST FREQUENT mbBack AND (mbForward + mbInter) ≥ t |
| 4 | B FRAME, MOST FREQUENT mbInter AND (mbForward + mbBack) < t |
| 5 | B FRAME, MOST FREQUENT mbInter AND (mbForward + mbBack) ≥ t |
| 6 | P FRAME, mbOther ≥ s |
| 7 | P FRAME, mbIntra ≥ s |
| 8 | P FRAME OTHER THAN 6 AND 7 |

COMPUTATION OF FORWARD VARIABLE $\alpha_{t+1}(j)$

COMPUTATION OF BACKWARD VARIABLE $\beta_t(i)$

FLOW OF COMPUTING THE PROBABILITY OF EXISTING IN
STATE i AT TIME t AND STATE j AT TIME t + 1

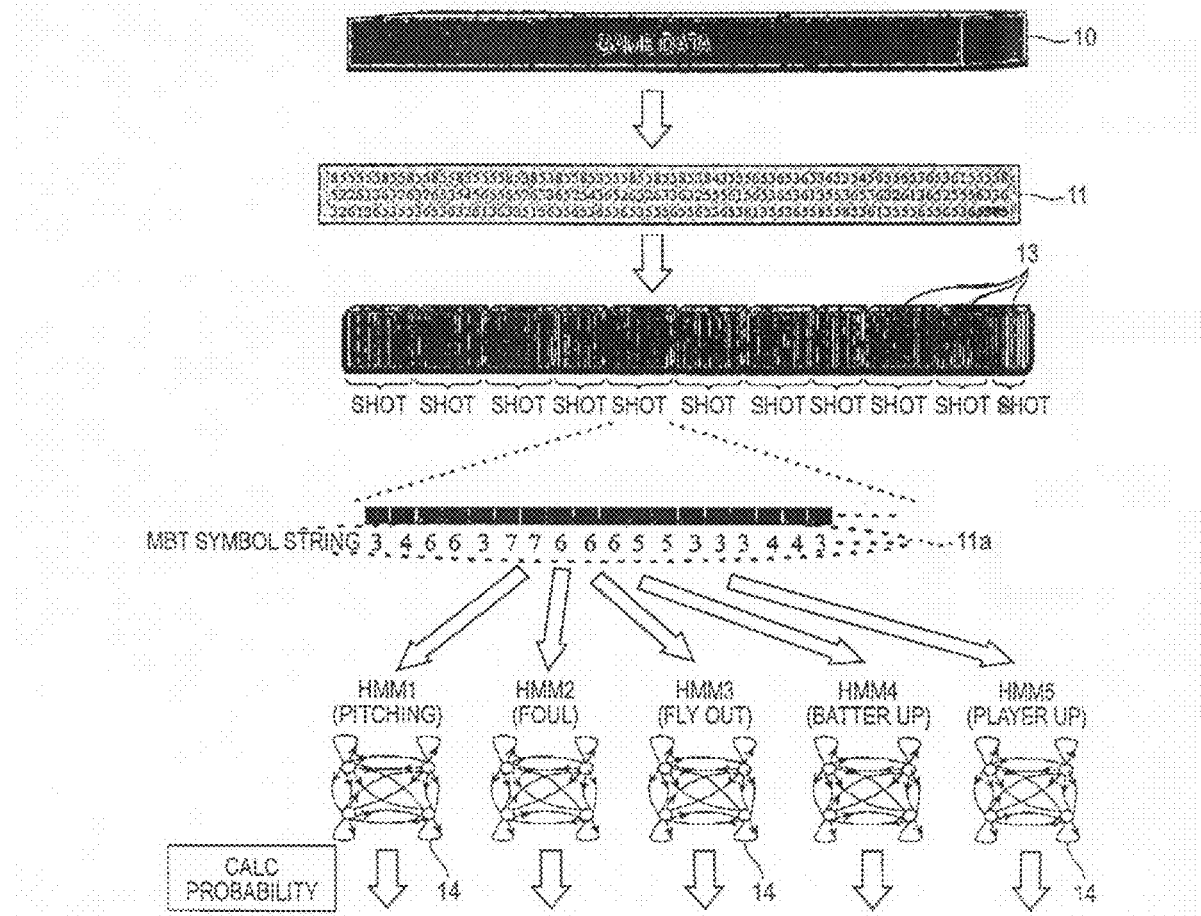

CUT POINT DETECTION SYSTEM AND SHORT RECOGNITION SYSTEM USING THE SAME, CUT POINT DETECTION METHOD AND CUT POINT DETECTION PROGRAM

BACKGROUND

The present invention relates to a cut point detection system for detecting the cut point in the moving picture compressed data, a shot identification system for identifying the contents of a shot partitioned by this cut point detection system, a cut point detection method, and a cut point detection program.

In recent years, the terrestrial digital broadcasting and the Internet broadcasting have begun to spread into the ordinary households, and as the computer technologies, particularly, the storage technologies, have rapidly expanded, an HDD recorder with a storage device having a capacity of terabytes, which was unthinkable several years ago, has been available on the market.

In this situation, there is not only a conventional way of enjoyment in which many programs (contents) are recorded beforehand, and when one wants to see a program, one sees it, but also there has been a growing interest in the multi-media database having a high edit function of automatically retrieving only a desired spot (scene) from an enormous number of contents, or automatically creating a highlight scene in which only the scenes of special note are collected from a long time program such as a sports program.

One of the basic technologies for realizing this multi-media database needs an operation of dividing one video contents into scenes, and reconstructing them. That is, a method for automatically making an operation of specify the data position where the scene changes, and classifying each scene according to its contents, namely, video indexing, is required.

Conventionally, the invention of this kind is a hierarchical mixed type shot conversion detection method in the MPEG compressed video environment as described in patent document 1, for example.

In this invention, first of all, a scene candidate section is detected using a difference in the overall color distribution between I frames by applying a shot detection algorithm based on the color histogram. The P frame within each detected candidate section is additionally decoded. A reduced shot conversion candidate section is obtained using a difference in the overall color histogram between adjacent I/P, P/P or P/I frames. For the shot conversion candidate section, each B frame within the section is decoded at macro-block level to obtain a distribution characteristic of the intra-coding block and the reference type and reference pattern of each B frame, and detect an instantaneous cut point, using them.

As another prior art, a cut point detection method as described in non-patent document 1 involves firstly detecting a GOP (Group Of Picture) containing the cut point, using DC image information of I frame (refer to non-patent document 1:3.1.1 I method).

Subsequently, for the GOP judged that the cut point is contained through the above process, the cut point position is detected on a frame basis, using an MBT (Macro Block Type) (refer to non-patent document 1:3.1.2 MBT method), and to decrease the detected points, for each B frame pair $(B_i, B_{i+1})$ in the GOP, $$\Delta = |f_i - b_i| + |f_{i+1} - b_{i+1}|$$

($f_i$, $f_{i+1}$: number of forward predictive MBT, $b_i$, $b_{i+1}$: number of backward predictive MBT)
is computed, whereby the B frame pair taking the maximum value $\Delta_{max}$ is obtained, and when the ratio of the value taken by another frame to $\Delta_{max}$ is less than or equal to a predetermined threshold value $T_A$, it is judged that the cut point occurs.

And with this prior art, the instantaneous cut point is successfully detected at a high detection ratio of 90% or more through the gradual process.

However, in the former prior art, the gradual detection process of detecting the candidate section and detecting the cut point in the candidate section is required, and a multiplicity of decoding processes including the process for decoding the P frame and the process for decoding the B frame at macro block level are required, and take a lot of time.

Also, in the latter prior art, the gradual process including the rough detection on a GOP basis using the DC image and the detection of B frame using the feature of macro block type is required, and the arithmetic operation process taking a relatively long processing time is required to improve the detection precision, whereby there is a scope for improvement to simplify the process or shorten the overall processing time by increasing the speed.

Also, in any of the former and latter processes, after the cut point is detected, the contents of video for the shot partitioned by the cut point can not be identified
[Patent Document 1]
Japanese Patent Publication No. 2001-313956A
[Non-Patent Document 1]
"Detecting the cut point of MPEG2 compressed moving picture using Macro Type Block", Information Processing Society of Japan, Collected papers: Computer Vision and Image Media, Vol. 46, No. SIG15 (CVIM12), pp. 51-58, October 2005.

SUMMARY

This invention has been achieved in the light of the above-mentioned conventional circumstances, and it is an object of the invention to provide a cut point detection system, a shot identification system using the cut point detection system, a cut point detection method, and a cut point detection program, in which the cut point can be detected from the moving picture compressed data at high speed and high precision, and further the contents of shot partitioned from the detected cut point can be identified at high speed and high precision.

In order to accomplish the above object, a cut point detection system of the first invention is characterized by comprising means for extracting the MBT information for each frame from the moving picture compressed data containing the MBT information, means for creating an MBT symbol string by obtaining the frequency at which a specific MBT is contained from the extracted MBT information for each frame, appending a predetermined MBT symbol to each frame in accordance with its frequency feature, and arranging the MBT symbols according to the frame order, and means for discriminating the cut point of moving picture from an array feature of MBT symbols in the MBT symbol string.

With the first invention, the MBT information for each frame is firstly extracted from the moving picture compressed data. And the frequency at which a specific MBT is contained is obtained from the extracted MBT information, and the frequency feature is represented by a predetermined MBT symbol. That is, the MBT symbol is appended to each frame in accordance with the frequency feature of specific MBT in the MBT information for each frame.

And the MBT symbols are arranged according to the frame order to constitute an MBT symbol string composed of a plurality of MBT symbols.

Next, the cut point of moving picture is discriminated from an array feature of MBT symbols in the MBT symbol string.

The moving picture compressed data may contain the MBT information (Macro Block Type information). The specific examples of the moving picture compressed data include the MPEG data and the H261 data.

Also, the MBT symbol may be any selected symbol such as "0", "1", "2", "A" or "X".

Also, the cut point detection system of the second invention is characterized in that the MBT symbols include a first MBT symbol indicating that the frequency of forward predictive coded macro block number is largest, and a second MBT symbol indicating that the frequency of backward predictive coded macro block number is largest, and the cut point of moving picture is discriminated from an array feature of the first MBT symbol and the second MBT symbol in the MBT symbol string.

Also, the cut point detection system of the third invention is characterized in that the first MBT symbol indicates that the frequency of forward predictive coded macro block number is largest and a total of backward predictive coded macro block number and intra-coded macro block number is smaller than a predetermined threshold value.

Also, the cut point detection system of the fourth invention is characterized in that the second MBT symbol indicates that the frequency of backward predictive coded macro block number is largest and a total of forward predictive coded macro block number and intra-coded macro block number is smaller than a predetermined threshold value.

Also, the cut point detection system of the fifth invention is characterized in that when the two first MBT symbols are adjacent in the MBT symbol string, the cut point occurs immediately before the frame corresponding to the top MBT symbol of them.

Also, the cut point detection system of the sixth invention is characterized in that when the two second MBT symbols are adjacent in the MBT symbol string, the cut point occurs immediately after the frame corresponding to the last MBT symbol of them.

Also, the cut point detection system of the seventh invention is characterized in that when the first MBT symbol and the second MBT symbol are adjacent in frame order in the MBT symbol string, the cut point occurs between two frames corresponding to the two MBT symbols.

Also, a shot identification system of the eighth invention is characterized by comprising means for making a shot for an identification object between two cut points detected by the cut point detection system, and means for selecting and identifying the shot of identification object of which the probability is largest based on an estimation model using the MBT symbol string created by the cut point detection system.

Also, the shot identification system of the ninth invention is characterized in that the estimation model selects beforehand a specific event shot from the moving picture compressed data containing an event shot that is a shot to be identified, creating the MBT symbol string for each specific event shot, and learning the MBT symbol string as a learning object MBT symbol string for each event shot.

Also, the shot identification system of the tenth invention is characterized in that the estimation model is a hidden Markov model.

Also, a cut point detection method of the eleventh invention is characterized by including a step of computer extracting the MBT information for each frame from the moving picture compressed data containing the MBT information, a step of computer creating an MBT symbol string by obtaining the frequency at which a specific MBT is contained from the extracted MBT information for each frame, appending a predetermined MBT symbol to each frame in accordance with its frequency feature, and arranging the MBT symbols according to the frame order, and a step of computer discriminating the cut point of moving picture from an array feature of MBT symbols in the MBT symbol string.

Also, a cut point detection program of the twelfth invention is characterized by causing a computer to function as means for extracting the MBT information for each frame from the moving picture compressed data containing the MBT information, means for creating an MBT symbol string by obtaining the frequency at which a specific MBT is contained from the extracted MBT information for each frame, appending a predetermined MBT symbol to each frame in accordance with its frequency feature, and arranging the MBT symbols according to the frame order, and means for discriminating the cut point of moving picture from an array feature of MBT symbols in the MBT symbol string.

The present invention is configured as described above, and exhibits the following effects as described below.

With the invention, the MBT information is extracted directly from the moving picture compressed data without performing the decoding process, the MBT symbol string is created based on the frequency feature of the specific MBT contained in this MBT information, and the cut point is discriminated from the array feature of MBT symbols in this MBT symbol stung.

Accordingly, the process using the DC image information, the process for decoding the moving picture compressed data, and the arithmetical operation process as described in non-patent document 2 are not required, whereby the cut point can be detected through the relatively simple process alone at high speed and high precision.

Moreover, the contents of shot partitioned by the cut point can be identified at high speed and high precision, using the MBT symbol string used in detecting the cut point.

BRIEF DESCRIPTION OF THE DRAWINGS

FIG. 4 is a concept view showing the structure of a frame, and the kind of MBT.

FIG. 5 is a concept view showing the relationship between the position at which the cut point occurs and the frame referred to by the B frame.

FIG. 7 is a table showing the relationship between the MBT symbol and the condition for giving the MBT symbol.

FIG. 12 is a concept view showing the flow of a shot identification process.

DETAILED DESCRIPTION OF THE EMBODIMENTS

The disclosure of Japanese Patent Application No. 2006-211746 filed Aug. 3, 2006 including specification, drawings and claims is incorporated herein by reference in its entirety.

The preferred embodiments of the present invention will be described below with reference to the drawings.

Figure 1:
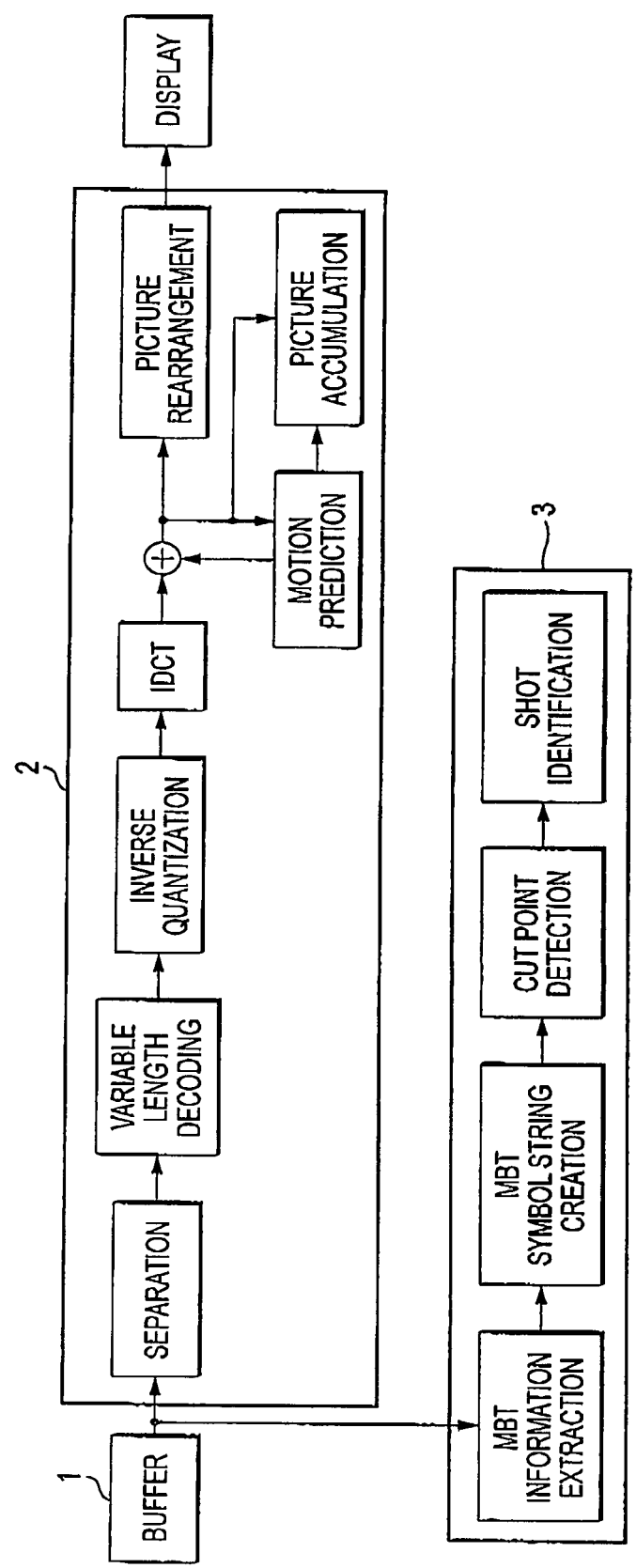
FIG. 1 is a block diagram showing one example of a cut point detection system and a shot identification system according to the present invention.

FIG. 1 is a block diagram showing the configuration of a cut point detection system and shot identification system according to the invention. To clarify the features of the invention, the configuration of a typical MPEG decoder is also shown in the same block diagram.

The moving picture compressed data stored in a recording medium such as a DVD or a hard disk is inputted via a buffer 1 into a decoder 2, as shown in FIG. 1. On the other hand, the cut point detection system and shot identification system 3 according to the invention extract the MBT information Macro Block Type information) from the moving picture compressed data before decoding.

This configuration is implemented as an apparatus such as a computer or a DVD recorder and a program or an electronic circuit for causing the apparatus to function, for example.

The decoder 2 is a device for decoding the moving picture compressed data through a well-known decoding process such as variable length decoding, inverse quantization and inverse discrete cosine transform (IDCT), in which the moving picture decoded by this decoder 2 is displayed on a display device such as a display.

The moving picture compressed data uses the MPEG2 data in one example in the mode of the invention.

The cut point detection system and shot identification system 3 extracts the MBT information directly from the moving picture compressed data, creates the MBT symbol string from the MBT information, and detects the cut point and identify the shot using this MBT symbol string.

Figure 2:
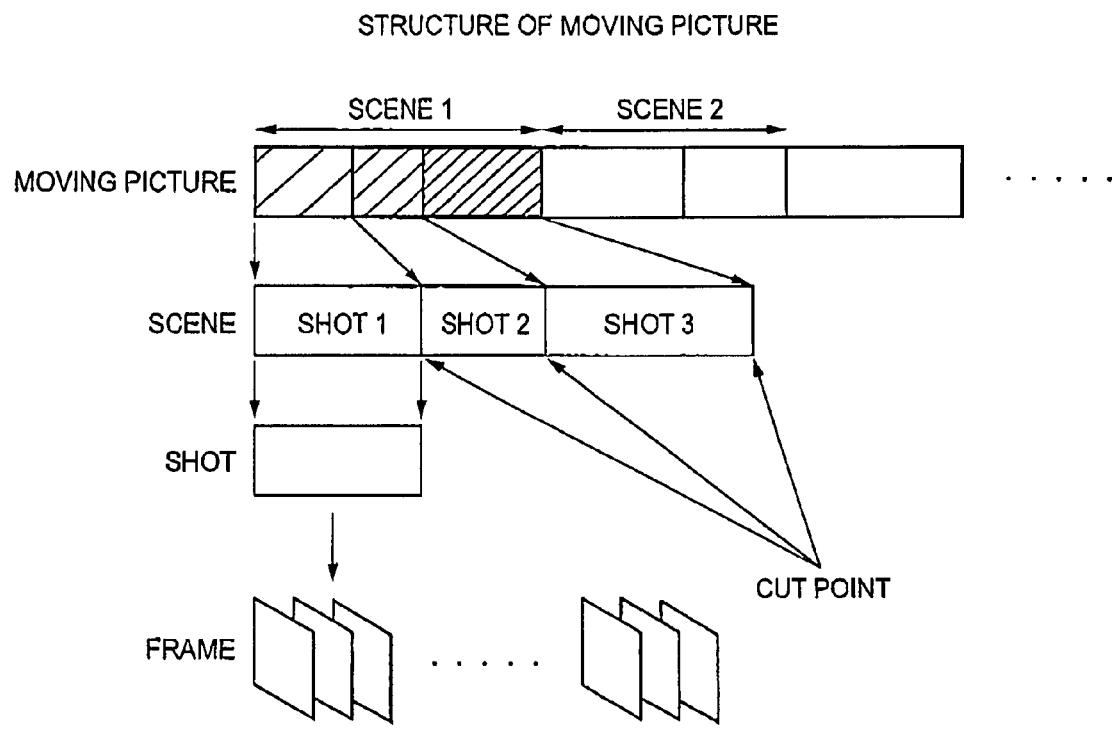
FIG. 2 is a concept view showing the typical structure of a moving picture.

Herein, taking a baseball video as an example, the cut point and shot will be described below. The moving picture is composed of a plurality of consecutive scenes, including a highlight scene such as home run and an accident scene such as dead ball or four ball, as shown in FIG. 2.

Each scene means consecutive sights meaningful on the story, and is composed of a plurality of consecutive shots. The shot means temporally or spatially consecutive sights usually captured by one camera, and each shot is composed of a plurality of consecutive frames.

Also, the cut point means a boundary point between shots, namely, a change point of video occurring by changing the cameras. That is, each shot is located between the cut points.

Generally, the cut points include an instantaneous cut point (also called a hard cut point) at which the video suddenly changes, a dissolve cut point, a wipe cut point, and other special cut points, but the cut point treated in this embodiment is the instantaneous cut point.

Also, the video of identification object is not the scene but the shot in this embodiment.

Figure 3:
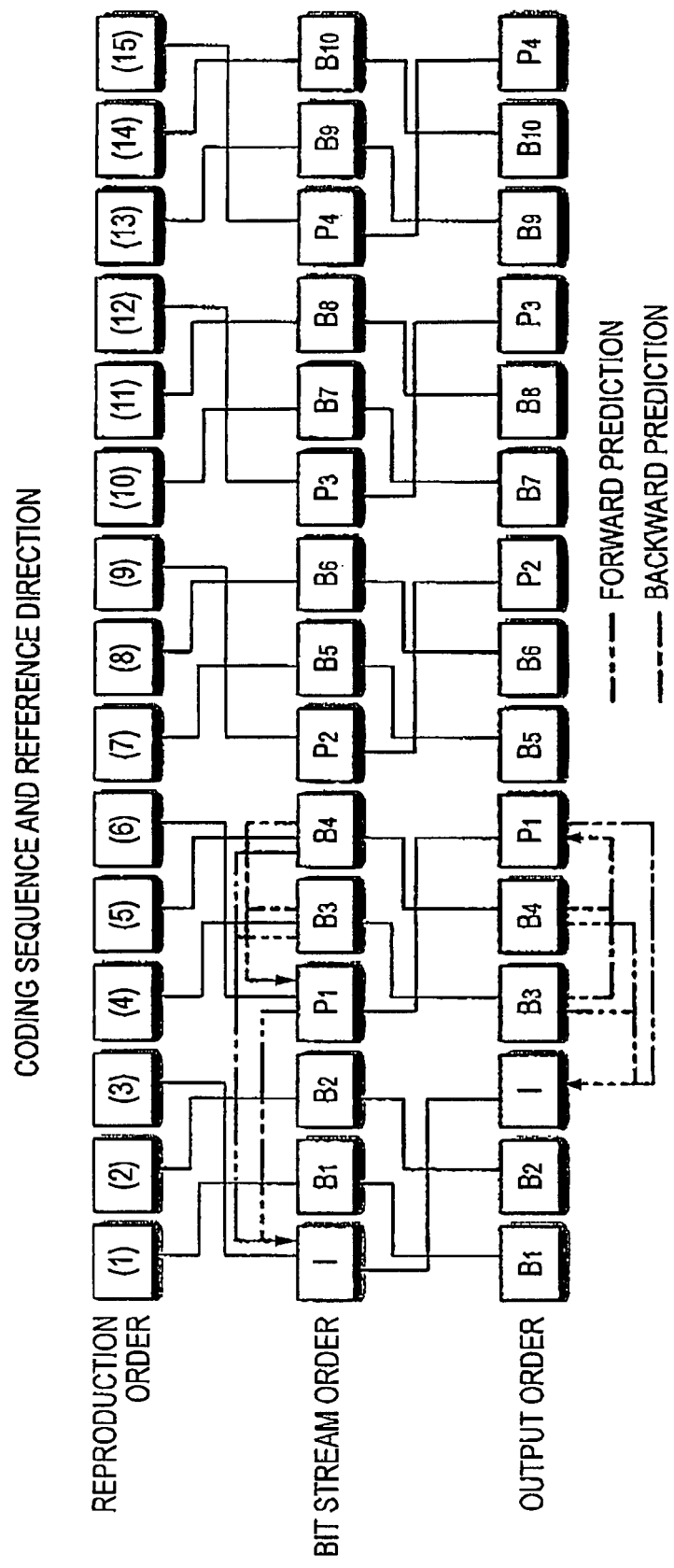
FIG. 3 is a concept view for explaining the relationship of the reproduction order, the bit stream order and the output order for the moving picture compressed data.

A plurality of frames making up each shot are data in reproduction order as shown in FIG. 3, but data is put in bit stream order as shown in FIG. 3, because the order is changed in encoding.

Further, data in this bit stream order is changed in the order when decoded, and restored to the original order (same order as the reproduction order) so that the data is put in output order as shown in FIG. 3.

In this embodiment, the reproduction order or output order is called a frame order.

Also, the moving picture compressed data treated in this embodiment is typical MPEG2 data in which one GOP (group of picture) is composed of 15 compressed image frames, and two consecutive B frames are periodically contained in this one GOP.

Each frame is composed of a number of MBs (macro blocks) arranged like a matrix of cells, as shown in FIG. 4. Each MB is given an attribute called an MBT (macro block type). This MBT is written into a macro block layer of the moving picture compressed data as a corresponding code to each MB.

The MBT is the information indicating the coding method by which each MB is coded. The kinds of MBT include an intra-coding MBT (mbIntra), a forward predictive coding MBT (mbForward), a backward predictive coding MBT (mbBack), a bi-directional predictive coding MBT (mbInter), and other coding MBT (mbOther).

In this embodiment, the MBT is extracted from the moving picture compressed data of the MPEG2 method for each frame, and a plurality of extracted MBTs are treated as the MBT information for each frame.

Next, the pattern of positions at which the instantaneous cut point occurs will be described below.

The positions at which the instantaneous cut point occurs are classified into the following cases (i), (ii) and (iii), taking notice of one pair of consecutive B frames ($B_i$, $B_{i+1}$).

(i) case in which cut point occurs immediately before $B_i$ (ii) case in which cut point occurs between $B_i$ and $B_{i+1}$ (iii) case in which cut point occurs immediate after $B_{i+1}$ In the following, the influence on the coding of B frame in each case will be described.

In the case of (i), $B_i$ and $B_{i+1}$ can not get similar values by referring to I, and refer to similar P, as shown in FIG. 5A. Therefore, the number of MBs subjected to backward predictive coding is increased for both $B_i$ and $B_{i+1}$.

In the case of (ii), $B_i$ refers to I and $B_{i+1}$ refers to P, due to image similarity, as shown in FIG. 5B. Therefore, the number of MBs subjected to forward predictive coding for I is increased for $B_i$ and the number of MBs subjected to backward predictive coding for P is increased for $B_{i+1}$.

In the case of (iii), both $B_i$ and $B_{i+1}$ refer to I due to image similarity. Therefore, the number of MBs subjected to forward predictive coding for I is increased for both $B_i$ and $B_{i+1}$.

Figure 6:
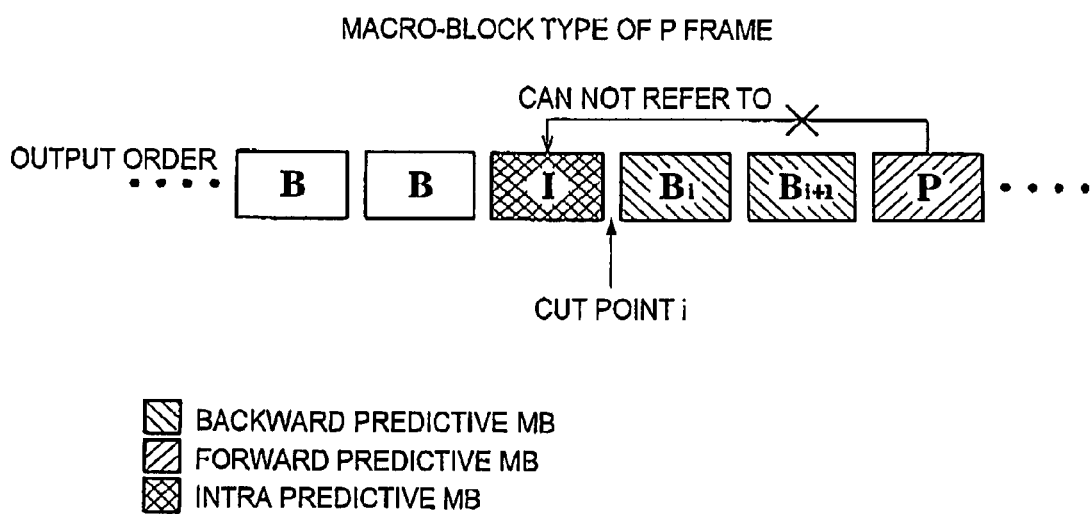
FIG. 6 is a concept view showing the relationship between the position at which the cut point occurs and the frame referred to by the P frame.

Though the MBT information for the B frame alone is particularly noted above, the MBT for the P frame is also allowed to select between the intra-coding MBT and the forward predictive coding MBT, in which its variation still depends on the motion of image. The P frame is basically composed of forward predictive coded MBs. However, when the cut point exists immediately previously, or the scene has too severe motion, the I frame or P frame in the past can not be referred to, so that the intra-coded MB occurs in the P frame, as shown in FIG. 6.

Also, there are four coding methods for MB, including the intra-coding method, the forward predictive coding method, the backward predictive coding method, and the bi-directional predictive coding method. In the MPEG2, there is an MB not subjected to these coding methods, and not requiring any information. A code is prepared for such MB. Such MB is skipped, and called a skipped macro block. And this skipped macro block has the same DCT coefficient as one previous MB, and occurs in the P frame, especially where there is less motion.

The above tendency is reflected to the MBT information for each frame. The present inventor has confirmed experimentally it, using the moving picture compressed data encoded by the generally available MPEG2 encoder.

In the cut point detection system and shot identification system 3 of this embodiment, the frequency at which a specific MBT is contained from the MBT information for each frame is obtained, based on the above fact, a predetermined MBT symbol is appended to each frame in accordance with its frequency feature, the MBT symbols are arranged according to the frame order to create an MBT symbol string, and the cut point of the moving picture is discriminated from the array feature of MBT symbols in this MBT symbol string.

More specifically, first of all, for the MBT information for each frame, the number of intra-coding MBT (mbIntra), the number of forward predictive coding MBT (mbForward), the number of backward predictive coding MBT (mbBack), the number of bi-directional predictive coding MBT (mbInter), and the number of other coding MBT (mbOther) are obtained.

As for the frequency feature of the MBT information for each frame, if the frequency of forward predictive coding MBT for the B frame is the maximum, and a total number of backward predictive coding MBT and intra-coding MBT is smaller than a predetermined threshold t, the frequency feature is represented by the preset first MBT symbol. This first MBT symbol is the symbol of number "0" in one example as listed in the table of FIG. 7.

That is, the symbol of "0" as the first MBT symbol is appended to the frame satisfying the condition.

Similarly, as the frequency feature of the MBT information for each frame, if the frequency of backward predictive coding MBT for the B frame is the maximum, and a total number of forward predictive coding MBT and intra-coding MBT is smaller than a predetermined threshold t, the frequency feature is represented by the second MBT symbol. This second MBT symbol is the symbol of number "2" in one example as listed in the table of FIG. 7.

That is, the symbol of "2" as the first MBT symbol is appended to the frame satisfying the condition.

Besides, for the B frame, if the frequency of forward predictive coding MBT is the maximum, and a total number of backward predictive coding MBT and intra-coding MBT is smaller than a predetermined threshold t, the symbol of "1" is appended to that frame, as listed in the table of FIG. 7.

Also, for the B frame, if the frequency of backward predictive coding MBT is the maximum, and a total number of forward predictive coding MBT and intra-coding MBT is greater than or equal to a predetermined threshold t, the symbol of "3" is appended to that frame.

Also, for the B frame, if the frequency of intra-coding MBT is the maximum, and a total number of forward predictive coding MBT and backward predictive coding MBT is smaller than a predetermined threshold t, the symbol of "4" is appended to that frame.

Also, for the B frame, if the frequency of intra-coding MBT is the maximum, and a total number of forward predictive coding MBT and backward predictive coding MBT is greater than or equal to a predetermined threshold t, the symbol of "5" is appended to that frame.

Also, for the P frame, if the number of other coding MBT is greater than or equal to a predetermined threshold s, the symbol of "6" is appended to that frame.

Also, for the P frame, if the number of intra-coding MBT is greater than or equal to a predetermined threshold s, the symbol of "7" is appended to that frame.

The symbol of "8" is appended to the P frame other than "6" and "7".

The I frame is the static frame that does not refer to other frames, and is not given the symbol, because it does not directly contribute to the cut point detection and shot identification. However, the symbol of "9", for example, may be appended to the I frames as needed.

The reason why a restriction of the threshold t is given as described above is to reduce the false detection of the cut point, in which this threshold t is experimentally decided at an appropriate value.

The threshold s is intended to improve the identification ratio in the shot identification as will be described later, in which this threshold s is also experimentally decided at an appropriate value.

Figure 8:
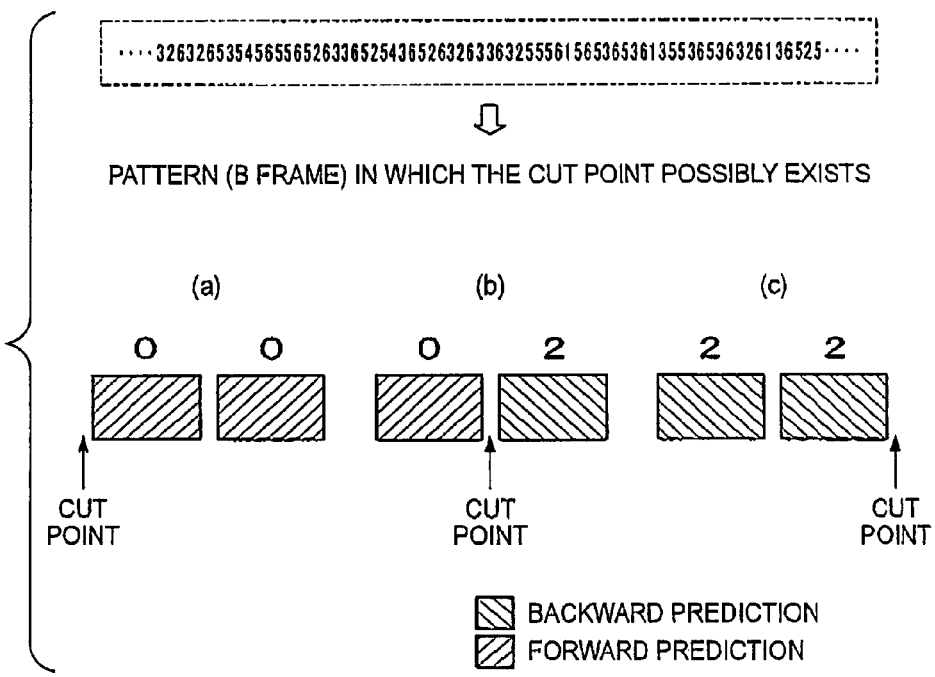
FIG. 8 is a concept view showing the relationship between the MBT symbol string and the cut point.

And the MBT symbols created in the above manner are arranged according to the frame order to make up a series of MBT symbol strings, as shown in FIG. 8.

Accordingly, in this MBT symbol string, each MBT symbol represents the frequency feature of specific MBT in the corresponding frame.

Next, in the cut point detection system and shot identification system 3 of this embodiment, when two first MBT symbols (specifically symbol "0") are adjacent, the instantaneous cut point occurs immediately before the frame corresponding to the top MBT symbol of them, as the array feature of MBT symbols in the MBT symbol string, as shown in FIG. 8A.

Also, when the first MBT symbol (specifically symbol "0") and the second MBT symbol (specifically symbol "2") are adjacent in the frame order, the instantaneous cut point occurs between two frames corresponding to these two MBT symbols, as shown in FIG. 8B.

Also, when the two second MBT symbols (specifically symbol "2") are adjacent, the instantaneous cut point occurs immediately after the frame corresponding to the last MBT symbol of them, as shown in FIG. 8C.

Next, the cut point detection system and shot identification system 3 has the shot of identification object between two cut points detected using the MBT symbol string in the above manner, and selects and identifies the shot of which the probability is largest from among the shots, based on an estimation model using the MBT symbol string created in the above manner.

This estimation model selects a specific event from the moving picture compressed data including the event that is the shot desired to be identified, creates the MBT symbol string for each specific event, and learns this MBT symbol string as the learning object MBT symbol string for each event.

According to one preferred embodiment of the invention, a hidden Markov model (HMM) is employed as the estimation model. This is a statistical method effective for modeling the indefinite time series data. The HMM will be described below in detail.

(HMM Elements)

Supposing that the observation series is $O=(o_1, o_2, \ldots, o_T)$ the HMM of discrete symbol probability event has a state transition probability, a symbol output probability and an initial state probability, as the parameters, and is represented as follows.

1. N: Number of states in the model

It is supposed that the used model is linked to transit from one state to another state i.e., ergodic model). Each state is labeled as {1, 2, ... }, and the state at time t is denoted as $q_t$.

2. M: Number of observation symbols in each state, namely, the kinds of symbols, or the kinds of symbols given to the MBT symbol string in this embodiment. The individual symbols are defined as $V=\{v_1, v_2, \ldots, v_M\}$.

3. $A=\{a_{ij}\}$: state transition probability matrix, in which $a_{ij}$ is a transition probability from state i to state j.

Where $$\{a_{ij}\}=P[q_{t+1}=j|q_t=i], 1 \leq i,j \geq N \quad \text{[Formula 1]}$$

4. $B=\{b_j\{k\}\}$: observation symbol probability distribution

Where $$\{b_j(k)\}=P[o_t=v_k|q_t=j], 1 \leq k \leq M \quad \text{[Formula 2]}$$

This defines a symbol distribution at state j (j=1, 2, ..., N).

5. $\pi=\{\pi_i\}$: initial state probability distribution

Where $$\{\pi_i\}=P[q_1=i], 1 \leq i \leq M \quad \text{[Formula 3]}$$

From the above, a set of two model parameters N, M, observation symbols and three probability scales A, B and $\pi$ are needed to fully describe the HMM. Herein, for the sake of simplicity, the following simple notation is used to indicate the entire parameter set of the model.

$$\lambda=(A,B,\pi) \quad \text{[Formula 4]}$$

The probability of O, $P(O|\lambda)$ can be defined using this parameter set.

(Recognition Using the Model)

When the HMM is used in this embodiment, the HMMs are prepared for the number of kinds of event (shot unit) to be concerned, and for the data to be recognized, the probability that the data is output from each HMM is computed to make the recognition. That is, $\{\lambda_1, \lambda_2, \ldots, \lambda_n\}$ are prepared for the number of kinds of event, and $P(O|\lambda_i)$ is computed for each $\lambda$, whereby the data is supposed to belong to the event with the largest probability. Basically, $P(O|\lambda_i)$ is the sum of the probability for possible state transition, but usually the computation amount is excessively large, whereby it is important to make the computation efficiently. Therefore, a method called a forward algorithm will be described below. This is employed not only in the recognition process but also in the parameter estimation.

(Forward Algorithm)

The forward variable $\alpha_t(i)$ is defined as follows.

$$\alpha_t(i)=P(o_1 o_2 \ldots o_t, q_t=i|\lambda) \quad \text{[Formula 5]}$$

This is the probability of existing in the state i at time t after the partial observation series $o_1 o_2 \ldots o_t$ are outputted by the time t, when a model $\lambda$ is given. $\alpha_t(i)$ can be computed inductively in the following manner.

1) Initialization $$\alpha_1(i)=\pi_i b_i(o_1), 1 \leq i \leq N \quad \text{[Formula 6]}$$

2) Induction $$\alpha_{t+1}(j) = \left[\sum_{i=1}^{N} \alpha_t(i)a_{ij}\right] b_j(o_{t+1}), \quad \text{[Formula 7]}$$

$$1 \leq t \leq T-1, 1 \leq j \leq N$$

3) End $$P(O|\lambda) = \sum_{i=1}^{N} \alpha_T(i) \quad \text{[Formula 8]}$$

Figure 9:
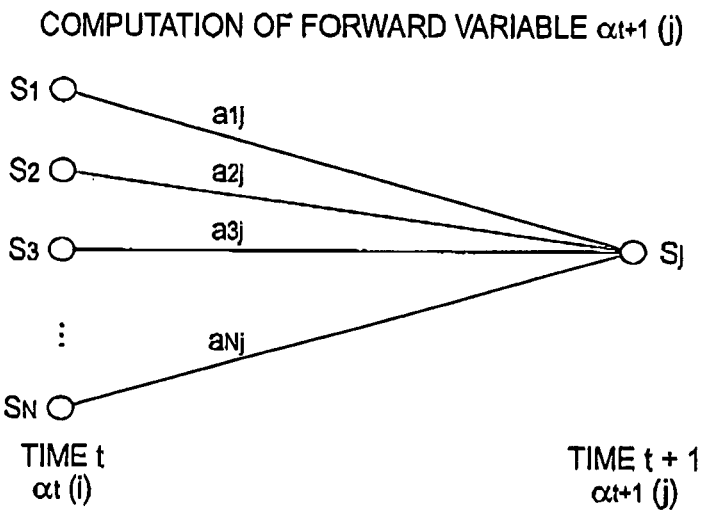
FIG. 9 is a concept view showing the computation of the forward variable $\alpha_{t+1}(j)$.

At an initialization step, the forward probability is initialized as the simultaneous probability of state i and initial observation event $o_1$. An induction step is made as shown in FIG. 9, which indicates how to come from the attainable N states i ($1 \leq i \leq N$) at time t to state j at time t+1.

$\alpha_t(i)$ is the probability of simultaneous event that arrives at state j at time t+1 after passing through state i at time t, where $o_1 o_2 \ldots o_t$ are observed. The result of summing the products for all the possible N states i ($1 \leq i \leq N$) at time t is the probability of existing in the state j at time t+1 in consideration of all the partial observation events before the time t. Once this is computed and j is decided, $\alpha_{t+1}(i)$ is obtained by considering the observation event $o_{t+1}$ in state j, namely, multiplying the result of summing the probability $b_j(o_{t+1})$. The computation of the expression as shown in Formula 7 is performed for all the states j ($1 \leq j \leq N$) at time t, and further repeated for t=1, 2, ... T-1.

Finally, the probability $P(O|\lambda)$ of interest is obtained by summing the probability $\alpha_T(i)$ at an end of the forward probability at an end step. Because from the definition, $$\alpha_T(i)=P(o_1 o_2 \ldots o_T, q_T=i|\lambda) \quad \text{[Formula 9]}$$

$P(O|\lambda)$ is simply a sum of $\alpha_T(i)$.

(Learning)

When the HMM is actually used, it is problematical how the model parameter $(A,B,\pi)$ is decided. A method for analytically obtaining a model parameter set for maximizing the probability of observation series is unknown. However, a Baum-Welch method is well known in which the model parameter $\lambda=(A,B,\pi)$ is obtained where the likelihood $P(O|\lambda)$ is locally maximum refer to Lawrence Rabiner and Biing-Hwang Juang, "Fundamentals of Speech Recognition", 1993). In this embodiment, this method is employed. Herein, the Baum-Welch method will be described below, but a Backward Algorithm will be described as the algorithm required for the Baum-Welch method.

(Backward Algorithm)

The backward variable as defined below can be considered in the same manner as the Forward Algorithm.

$$\beta_t(i)=P(o_{t+1} o_{t+2} \ldots o_T|q_t=i,\lambda) \quad \text{[Formula 10]}$$

This is the probability of the partial observation series from time t+1 to the end, when a model $\lambda$ and state i at time t are given. $\beta_t(i)$ can be also inductively computed in the following manner.

1) Initialization $$\beta_T(i)=1, 1 \leq i \leq N \quad \text{[Formula 11]}$$

2) Induction $$\beta_t(i) = \sum_{j=1}^{N} a_{ij} b_j(o_{t+1}) \beta_{t+1}(j), \quad \text{[Formula 12]}$$

$$t = T-1, T-2, \ldots, 1, 1 \leq i \leq N$$

Figure 10:
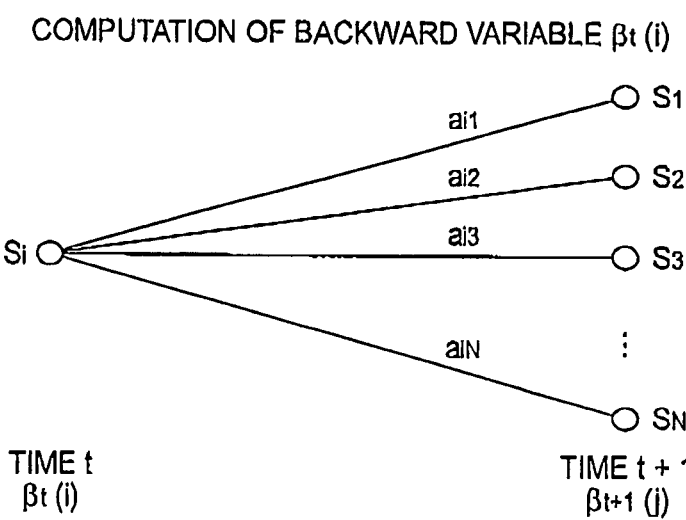
FIG. 10 is a concept view showing the computation of the backward variable $\beta_t(j)$.

At an initialization step, $\beta_T(i)$ is defined to be equal to 1 for every i. FIG. 10 shows the following items. To consider the observation series from time t+1 after existing in state i at time t, it is required to consider every state j attainable at time t+1, transition ($a_{ij}$ term) from i to j, observation event $o_{t+1}$ ($b_j(o_{t+1})$ term) in state j, and the partial observation series ($\beta_{t+1}(j)$ item) from state j and following. A re-estimation method (Baum-Welch method) for the HMM parameter will be described below, using the forward variable and the backward variable as obtained above.

(Baum-Welch Algorithm)

To begin with, when the model and the observation series are given, the probability $\xi_t(i,j)$ of existing in state i at time t and existing in state j at time t+1 is defined.

$$\xi_t(i,j) = P(q_t=i, q_{t+1}=j | O, \lambda) \quad \text{[Formula 13]}$$

Figure 11:
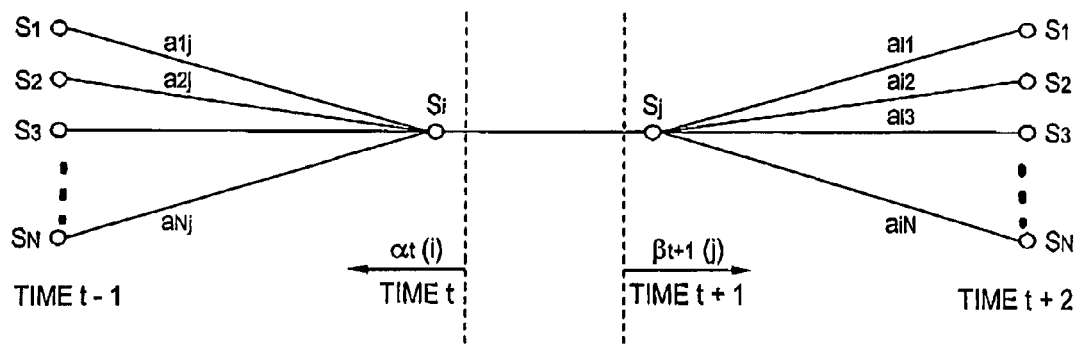
FIG. 11 is a concept view showing the flow of computing the probability of existing in the state i at time t and the state j at time t+1.

The paths satisfying the condition as shown in Formula 13 are shown in FIG. 11. $\xi_t(i,j)$ can be written from the definition of the forward and backward variables in the following manner.

$$\xi_t(i, j) = \frac{P(q_t = i, q_{t+1} = j | O, \lambda)}{P(O|\lambda)} = \frac{\alpha_t(i) a_{ij} b_j(o_{t+1}) \beta_{t+1}(j)}{P(O|\lambda)} \quad \text{[Formula 14]}$$

$$= \frac{\alpha_t(i) a_{ij} b_j(o_{t+1}) \beta_{t+1}(j)}{\sum_{i=1}^{N} \sum_{j=1}^{N} \alpha_t(i) a_{ij} b_j(o_{t+1}) \beta_{t+1}(j)}$$

Also, when the model and the entire observation series are given, the probability $\gamma_t(i)$ of existing in state i at time t is defined as follows.

$$\gamma_t(i) = P(q_t = i | O, \lambda) = \frac{P(O, q_t = i | \lambda)}{P(O|\lambda)} = \frac{P(O, q_t = i | \lambda)}{\sum_{i=1}^{N} P(O, q_t = i | \lambda)} \quad \text{[Formula 15]}$$

Since $P(O, q_t=i|\lambda)$ is represented as $\alpha_t(i)\beta_t(i)$ using the forward and backward variables, $\gamma_t(i)$ can be written in the following manner.

$$\gamma_t(i) = \frac{\alpha_t(i) \beta_t(i)}{\sum_{i=1}^{N} \alpha_t(i) \beta_t(i)} \quad \text{[Formula 16]}$$

Whereby $\gamma_t(i)$ is associated with the summation of $\xi_t(i,j)$ for j. That is, $$\gamma_t(i) = \sum_{j=1}^{N} \xi_t(i, j) \quad \text{[Formula 17]}$$

Summing $\gamma_t(i)$ over time t, a value regarded as the expected value of the number of visiting the state i can be obtained. The total sum except for the time t=T is equivalent to the expected value of the number of transiting from state i. Similarly, the summation of $\xi_t(i,j)$ over time t (from t=1 to t=T−1) is the expected value of the number of transiting from state i to state j. That is, $$\sum_{t=1}^{T-1} \gamma_t(i) = \text{expected value of the number of transiting from state } i \text{ in } O \quad \text{[Formula 18]}$$

$$\sum_{t=1}^{T-1} \xi_t(i, j) = \text{expected value of the number of transiting from state } i \text{ to state } j \text{ in } O \quad \text{[Formula 19]}$$

Using the above formulas and a concept of counting the occurrences of event, a re-estimation method for the parameter of HMM can be presented. An appropriate re-estimation expression for $\pi$, A and B is given in the following manner.

$$\bar{\pi}_j = \text{expected frequency (number) of existing in state } i \text{ at time}(t=1) \quad \text{[Formula 20]}$$
$$= \gamma_1(i)$$

$$\bar{a}_{ij} = \text{expected value of the number of transiting from state } i \text{ to state } j / \text{expected value of the number of transiting from state } i \quad \text{[Formula 21]}$$

$$= \frac{\sum_{t=1}^{T-1} \xi_t(i, j)}{\sum_{t=1}^{T-1} \gamma_t(i)}$$

$$\bar{b}_j(k) = \text{expected value of the number of remaining in state } j \text{ and observing symbol } v_k / \text{expected value of the number of remaining in state } j \quad \text{[Formula 22]}$$

$$= \frac{\sum_{t=1, \, s.t. \, o_j = v_k}^{T} \gamma_t(j)}{\sum_{t=1}^{T} \gamma_t(i)}$$

It is supposed that the current model is $\lambda = (A, B, \pi)$, and employed to compute the right side of the expressions of Formulas 20 to 22. And the re-estimation model decided by the left side of the expressions of Formulas 20 to 22 is defined as the expression of Formula 23.

$$\bar{\lambda} = (\bar{A}, \bar{B}, \bar{\pi}) \quad \text{[Formula 23]}$$

Baum et al. refer to Lawrence Rabiner and Biing-Hwang Juang, "Fundamentals of Speech Recognition", 1993) proved that the model bar $\lambda$ (bar means symbol with logical NOT symbol) is more likely than the model $\lambda$ in the sense of the expression as shown by Formula 24. That is, a new model bar $\lambda$ with stronger possibility that the observation series are generated could be acquired.

$$P(O|\bar{\lambda}) > P(O|\lambda) \quad \text{[Formula 24]}$$

If the re-estimation computation is repeated based on the above method, using the bar $\lambda$ repeatedly by replacing bar $\lambda$ with $\lambda$, the probability that O is observed from its model can be increased up to a certain limit point. The final result of this re-estimation method is the maximum likelihood estimation value of HMM. In this embodiment, an experiment for learning and recognition was conducted by creating a program for this re-estimation method (Forward Algorithm·Backward Algorithm·Baum-Welch Algorithm) in Java (registered trademark). If the computation of this re-estimation is actually performed in this manner, each term of the forward variable $\alpha_t(i)$ starts to go exponentially to 0. Hence, since the precision of all computers is basically surpassed, a scaling process is required to perform this computation.

A specific procedure for identifying the shot with the hidden Markov model (HMM) will be described below.

(Learning of Event Shot)

First of all, the MBT symbol string is created for the moving picture compressed data including a specific event shot that is the shot desired to be identified.

The specific event shots include a pitch shot, a foul fly shot, a fly out shot, a batter up shot, a player up shot and so on, in the case where the moving picture compressed data is a baseball video, for example.

And the moving picture compressed data is divided into shot units at the cut point.

In this case, the cut point is detected using the MBT symbol string in the above manner, but may be detected by any other well-known technique.

Next, a range of the MBT symbol string corresponding to the event shot of correct answer is checked by visually inspecting each video divided into shot units.

And this MBT symbol string is made the learning object MBT symbol string by appending a correct label to the MBT symbol string corresponding to the event shot of correct answer.

And the model parameter of HMM is estimated for each learning object MBT symbol string, using the above Baum-Welch algorithm. Thereby, the HMM that is the estimation model for each event is constructed.

The above process is a pre-processing manually made as the former stage for shot identification.

Referring to FIG. 12, a shot identification process automatically performed by the cut point detection system and shot identification system 3 will be described below in detail.

(Identification of Event Shot)

The cut point detection system and shot identification system 3 creates the MBT symbol string 11 by extracting the MBT information for each frame from the moving picture compressed data 10 containing the shot of identification object, and appending a predetermined symbol to each frame, based on this the MBT information, in accordance with the conditions of the table as shown in FIG. 7, as already described. And the cut point is detected from the array feature of the first MBT symbol ("0") and the second MBT symbol ("2") in the MBT symbol string 11, and a plurality of frames located between two detected cut points is made the shot 13 of identification object.

Next, the cut point detection system and shot identification system 3 performs an identification process for the MBT symbol string 11a for each of all the shots 13 divided at the cut point.

More particularly, the probability that the MBT symbol string 11a for each shot 13 is outputted from the estimation model 14 (specifically the HMM) prepared for each event shot is computed, and it is supposed that the MBT symbol string for each shot 13 is outputted from the estimation model 14 with the largest output probability. In this manner, the event shot to which each shot 13 belongs is identified.

Though in the above embodiment, the HMM (hidden Markov model) is used as the estimation model, another learning algorithm (e.g., genetic algorithm, neural network, etc.) may be employed as another example.

EXAMPLE 1

Instantaneous Cut Point Detection Experiment

The results of an experiment for detecting the cut point from the MPEG2 data of actual baseball video using the cut point detection system and shot identification system 3 of the above configuration will be described below.

First of all, the used MPEG2 data and an evaluation method for the cut point detection will be described below.

(Used Video)

The used video was MPEG2 moving picture data produced from video data inputted from a DVD recorder by mounting an MPEG capture box on the commercially available PC.

The moving picture had a resolution of 640×480 and the bit rate was a VBR (Variable Bit Rate, variable speed) with 5.5 Mbps on average and 8 Mbps at maximum.

The profile and level is MP@ML and GOP is IBBPBBPBBPBBPBBIBB . . . in which the P frame is followed by two B frames, with a configuration of N=2. One GOP is basically composed of one I frame, four P frames and ten B frames, or a total of fifteen frames. However, the other random GOP exists, in which the random GOP is composed of a multiple of 3 frames less than 15. And the time interval of 1GOP is 0.5 sec.

(Evaluation Method for Instantaneous Cut Point Detection)

First of all, the results of instantaneous cut point detection are evaluated using the following expressions.

CSC (Correct Scene Change): Number of known correct answer cut points

CD (Correct Detection): Number of correctly detected cut points

FD (False Detection): Number of falsely detected cut points

CD+FD: Number of detected cut points

Using these, the detection rate, the false detection rate and the detection performance are defined in the following manner.

RCD (Rate of Correct Detection): detection rate $$RCD=100(CD/CSC) \tag{4.1}$$

The detection rate is used to check the rate at which the cut points are correctly detected.

RFD (Rate of False Detection): False detection rate $$RFD=100\{FD/(CD+FD)\} \tag{4.2}$$

The false detection rate is used to check the rate at which the detected cut points include false detection.

DP (Detection Performance): detection performance $$DP=100\{(CD-FD)/CSC\} \tag{4.3}$$

The detection performance is used to judge comprehensively the detection rate and the false detection rate. If only the detection rate is excellent but the false detection rate is high, the cut point detection is not practical. Therefore, DP is set as an index for evaluating both the detection rates. In the experiment, the detection is best when the value of DP is highest.

It is required to find beforehand the known correct answer cut point to raise the detection rate of cut point. This is made by confirming the actual video by eyes while seeing it and labeling the correct answer cut point manually.

A Baum-Welch program for detecting the cut point and constructing the hidden Markov model was created in JAVA registered trademark). The language specification of JAVA (registered trademark) has an advantage that the debug is easily made because the type check is strict and the handling of input/output error is superior. Further, JAVA (registered trademark) is a programming language aiming at the multi-platform, and less dependent on the OS. JAVA registered trademark) was employed because one common source code is usable in various environments of the world where various kinds of OSs have spread.

(Evaluation for Instantaneous Cut Point Detection Experiment)

An experiment was conducted with the following baseball video (MPEG2 data).

TABLE 1

| Video | Time | Number of already known cut points |
|---|---|---|
| Baseball 1 | 90 min. | 596 |
| Baseball 2 | 90 min. | 523 |
| Baseball 3 | 90 min. | 597 |

For the Used Moving Picture

Also, in creating the MBT symbol string for the B frame, the threshold t in the table as shown in FIG. 7 was t=350.

(Detection Result)

The detection results of proposal method for each baseball video are listed below.

(1) Baseball 1

TABLE 2

| Evaluation expression | CSC | CD | FD | RCD | RFD | DP |
|---|---|---|---|---|---|---|
| Proposal method | 596 | 580 | 14 | 97.3% | 1.5% | 95.1% |

(2) Baseball 2

TABLE 3

| Evaluation expression | CSC | CD | FD | RCD | RFD | DP |
|---|---|---|---|---|---|---|
| Proposal method | 523 | 517 | 8 | 98.9% | 2.4% | 97.3% |

(3) Baseball 4

TABLE 4

| Evaluation expression | CSC | CD | FD | RCD | RFD | DP |
|---|---|---|---|---|---|---|
| Proposal method | 597 | 579 | 16 | 97.0% | 2.7% | 94.3% |

(Consideration)

<Detection Rate>

In all of the baseballs 1, 2 and 3, the very high results of 97% or more could be obtained.

<False Detection Rate>

The false detection was suppressed as low as below 3% in any case. Also, the false detection often occurred when the camera was photographing the player, and another player momentarily cut across, and was inevitable.

<Detection Performance>

The detection performance was as low as 94.3% in the baseball 3, but still practical enough. In the cut point detection experiment as described in non-patent document 2 as the prior art, the detection performance was 92.31% for the sports video, in which the process was simpler than the prior art, and produced the more favorable results.

EXAMPLE 2

Shot Identification Experiment

Using the cut point detection system and shot identification system 3 of the above configuration, the results of an experiment for identifying the shot for the MPEG2 data of actual baseball video will be described below.

The execution environment and the used moving picture were the same as the experiment as described in the example 1. Also, a pitch shot detection evaluation method, like the instantaneous cut point detection evaluation method, is settled in the following manner.

(Shot Identification Evaluation Method)

The correctness of recognizing the pitch shot by identifying the shot is evaluated using the following expressions.

CS (Correct Shot): Number of known correct answer pitch shots

CR (Correct recognition): Number of correctly recognized pitch shots

FR (False recognition): Number of falsely recognized pitch shots

CR+FR: Number of recognized shots

Using these, the recognition rate, the false recognition rate and the recognition performance are denied in the following manner.

RCR (Rate of Correct recognition); recognition rate $$RCR=100(CR/CS) \quad (4.4)$$

The recognition rate is used to check the rate at which the pitch shots are correctly recognized.

RFR (Rate of False recognition): False recognition rate $$RFR=100\{FR/(CR+FR)\} \quad (4.5)$$

The false recognition rate is used to check the rate at which the recognized pitch shots include the false recognition.

RP (recognition Performance): recognition performance $$RP=100\{(CR-FR)/CS\} \quad (4.6)$$

The recognition performance is used to judge comprehensively the recognition rate and the false recognition rate. If only the recognition rate is excellent but the false recognition rate is high, the pitch shot, like the cut point, is not practical. Therefore, RP is set as an index for evaluating both the recognition rates. In the experiment, the shot identification is best when the value of RP is highest.

It is required to find beforehand the known correct answer pitch shot to raise the recognition rate of pitch. Also, it is required to confirm what the shot is, if the pitch shot is falsely recognized, or not recognized, as the result of recognition experiment. Herein, the correct answer label was appended manually to not only the pitch but also all shots, while seeing the video.

(Constructing the HMM for Event Shot)

First of all, it is required to construct the HMM that is an estimation model for event shot. There are five kinds of HMM including a pitch shot, a foul fly shot, a fly out shot, a batter up shot, and a player up shot.

As the learning stage, the correct answer shot for each event shot was searched at three positions from the baseball 1 (see Table 1), and the MBT symbol string of correct answer shot was made the learning object MBT symbol string. The model parameters making up the HMM were estimated from this learning object MBT symbol string, using the above Baum-Welch algorithm.

The used at this time had the number of states N=4, and was liked to transit from one state to another state. Since the MBT symbol string composed of MBT symbols as shown in FIG. 7 was used for the observation symbol, the number of observation symbols M=9. Also, the thresholds t and s at this time were t=350 and s=150. The model parameters of each event shot are listed below. Three models were constructed for every event shot.

For each parameter, $\pi=\{\pi_i\}$: initial state probability, $A=\{a_{ij}\}$: state transition probability and $B=\{b_j(k)\}$: observation symbol probability · Pitch shot

- *HMM*1 (pitching) [Formula 25]

$\pi = [0.99997, 0.00001, 0.00001, 0.00001]$ $$A = \begin{bmatrix} 0.76029 & 0.05436 & 0.07739 & 0.10796 \\ 0.00001 & 0.37083 & 0.32718 & 0.30198 \\ 0.00001 & 0.37075 & 0.32721 & 0.30203 \\ 0.00001 & 0.37068 & 0.32721 & 0.30207 \end{bmatrix}$$

$$B = \begin{bmatrix} 0.41605 & 0.00001 & 0.37629 & 0.00001 & 0.00001 & 0.00001 & 0.00009 & 0.00001 & 0.20752 \\ 0.00001 & 0.06362 & 0.04437 & 0.27380 & 0.06762 & 0.26734 & 0.26845 & 0.00001 & 0.01478 \\ 0.00001 & 0.06330 & 0.04764 & 0.26936 & 0.06651 & 0.26664 & 0.26955 & 0.00001 & 0.01699 \\ 0.00001 & 0.02687 & 0.05043 & 0.26546 & 0.06552 & 0.26528 & 0.27180 & 0.00001 & 0.01862 \end{bmatrix}$$

- *HMM*2 (pitching)

$\pi = [0.99997, 0.00001, 0.00001, 0.00001]$ $$A = \begin{bmatrix} 0.77882 & 0.02847 & 0.05991 & 0.13280 \\ 0.00001 & 0.37069 & 0.32725 & 0.30205 \\ 0.00001 & 0.37150 & 0.32715 & 0.30135 \\ 0.00001 & 0.37269 & 0.32698 & 0.30031 \end{bmatrix}$$

$$B = \begin{bmatrix} 0.40805 & 0.00001 & 0.38819 & 0.00001 & 0.00001 & 0.00001 & 0.00001 & 0.00001 & 0.20369 \\ 0.00001 & 0.07100 & 0.02337 & 0.23895 & 0.07533 & 0.32082 & 0.23354 & 0.00001 & 0.03696 \\ 0.00001 & 0.06868 & 0.02618 & 0.23193 & 0.07299 & 0.31401 & 0.24697 & 0.00001 & 0.03922 \\ 0.00001 & 0.06571 & 0.02954 & 0.22243 & 0.06992 & 0.30288 & 0.26952 & 0.00001 & 0.03999 \end{bmatrix}$$

- *HMM*3 (pitching)

$\pi = [0.99997, 0.00001, 0.00001, 0.00001]$ $$A = \begin{bmatrix} 0.48466 & 0.15236 & 0.17302 & 0.18997 \\ 0.00315 & 0.37009 & 0.32622 & 0.30054 \\ 0.00444 & 0.36950 & 0.32582 & 0.30024 \\ 0.00609 & 0.36868 & 0.32533 & 0.29991 \end{bmatrix}$$

$$B = \begin{bmatrix} 0.90796 & 0.00010 & 0.00001 & 0.04511 & 0.00003 & 0.00148 & 0.04526 & 0.00001 & 0.00003 \\ 0.00001 & 0.06907 & 0.00365 & 0.22472 & 0.04375 & 0.37412 & 0.21517 & 0.00001 & 0.06950 \\ 0.00001 & 0.06836 & 0.00359 & 0.22610 & 0.04316 & 0.37048 & 0.22001 & 0.00001 & 0.06829 \\ 0.00001 & 0.06769 & 0.00354 & 0.22855 & 0.04261 & 0.36736 & 0.22300 & 0.00001 & 0.06723 \end{bmatrix}$$

· Foul fly shot

- *HMM*1 (faul) [Formula 26]

$\pi = [0.99997, 0.00001, 0.00001, 0.00001]$ $$A = \begin{bmatrix} 0.02491 & 0.35671 & 0.32018 & 0.29820 \\ 0.02492 & 0.35671 & 0.32017 & 0.29820 \\ 0.02492 & 0.35670 & 0.32017 & 0.29820 \\ 0.02492 & 0.35670 & 0.32017 & 0.29820 \end{bmatrix}$$

$$B = \begin{bmatrix} 0.17500 & 0.01309 & 0.00001 & 0.01309 & 0.12658 & 0.43649 & 0.00001 & 0.00001 & 0.23571 \\ 0.00001 & 0.01587 & 0.00001 & 0.01587 & 0.15343 & 0.52908 & 0.00001 & 0.00001 & 0.28570 \\ 0.00001 & 0.01587 & 0.00001 & 0.01587 & 0.15343 & 0.52908 & 0.00001 & 0.00001 & 0.28570 \\ 0.00001 & 0.01587 & 0.00001 & 0.01587 & 0.15343 & 0.52908 & 0.00001 & 0.00001 & 0.28570 \end{bmatrix}$$

- HMM2 (faul)

$\pi = [0.99997, 0.00001, 0.00001, 0.00001]$ $$A = \begin{bmatrix} 0.49791 & 0.00057 & 0.01091 & 0.49061 \\ 0.00001 & 0.35430 & 0.32557 & 0.32012 \\ 0.00001 & 0.38035 & 0.32524 & 0.29439 \\ 0.00001 & 0.43446 & 0.32215 & 0.24337 \end{bmatrix}$$

$$B = \begin{bmatrix} 0.99991 & 0.00001 & 0.00001 & 0.00001 & 0.00001 & 0.00001 & 0.00001 & 0.00001 & 0.00002 \\ 0.00001 & 0.03317 & 0.00001 & 0.08389 & 0.00772 & 0.67303 & 0.00001 & 0.00001 & 0.20215 \\ 0.00001 & 0.03060 & 0.00001 & 0.07754 & 0.00776 & 0.62288 & 0.00001 & 0.00001 & 0.26118 \\ 0.00001 & 0.02396 & 0.00001 & 0.05749 & 0.00661 & 0.47984 & 0.00001 & 0.00001 & 0.43206 \end{bmatrix}$$

- HMM3 (faul)

$\pi = [0.99997, 0.00001, 0.00001, 0.00001]$ $$A = \begin{bmatrix} 0.07691 & 0.33037 & 0.30455 & 0.28816 \\ 0.07692 & 0.33036 & 0.30455 & 0.28816 \\ 0.07692 & 0.33036 & 0.30455 & 0.28816 \\ 0.07692 & 0.33036 & 0.30455 & 0.28816 \end{bmatrix}$$

$$B = \begin{bmatrix} 0.04973 & 0.00766 & 0.00383 & 0.15327 & 0.00001 & 0.51344 & 0.01150 & 0.00001 & 0.26055 \\ 0.00001 & 0.00806 & 0.00403 & 0.16129 & 0.00001 & 0.54031 & 0.01210 & 0.00001 & 0.27419 \\ 0.00001 & 0.00806 & 0.00403 & 0.16129 & 0.00001 & 0.54031 & 0.01210 & 0.00001 & 0.27419 \\ 0.00001 & 0.00806 & 0.00403 & 0.16129 & 0.00001 & 0.54031 & 0.01210 & 0.00001 & 0.27419 \end{bmatrix}$$

· Fly out shot

- HMM1 (flyout)

$\pi = [0.99997, 0.00001, 0.00001, 0.00001]$ $$A = \begin{bmatrix} 0.60982 & 0.11668 & 0.13038 & 0.14312 \\ 0.01767 & 0.36470 & 0.32153 & 0.29611 \\ 0.02027 & 0.36393 & 0.32062 & 0.29519 \\ 0.02339 & 0.36274 & 0.31959 & 0.29428 \end{bmatrix}$$

$$B = \begin{bmatrix} 0.03577 & 0.16331 & 0.44814 & 0.10921 & 0.00001 & 0.02748 & 0.00001 & 0.00001 & 0.21606 \\ 0.00299 & 0.05086 & 0.00001 & 0.07154 & 0.00001 & 0.59544 & 0.00001 & 0.00001 & 0.27913 \\ 0.00300 & 0.05092 & 0.00001 & 0.07053 & 0.00001 & 0.58652 & 0.00001 & 0.00001 & 0.28899 \\ 0.00305 & 0.05143 & 0.00001 & 0.07046 & 0.00001 & 0.57784 & 0.00001 & 0.00001 & 0.29718 \end{bmatrix}$$

[Formula 27]

- HMM2 (flyout)

$\pi = [0.99997, 0.00001, 0.00001, 0.00001]$ $$A = \begin{bmatrix} 0.11167 & 0.57908 & 0.17703 & 0.13222 \\ 0.15225 & 0.11281 & 0.30975 & 0.42520 \\ 0.62051 & 0.07005 & 0.11913 & 0.19032 \\ 0.75627 & 0.05356 & 0.07400 & 0.11617 \end{bmatrix}$$

$$B = \begin{bmatrix} 0.00001 & 0.10560 & 0.00001 & 0.04723 & 0.00001 & 0.84500 & 0.00001 & 0.00001 & 0.00213 \\ 0.00001 & 0.00225 & 0.00001 & 0.43639 & 0.00001 & 0.33969 & 0.00001 & 0.00001 & 0.22162 \\ 0.00001 & 0.04480 & 0.00001 & 0.05539 & 0.00001 & 0.33647 & 0.00001 & 0.00001 & 0.56328 \\ 0.00001 & 0.10096 & 0.00001 & 0.01513 & 0.00001 & 0.29364 & 0.00001 & 0.00001 & 0.59022 \end{bmatrix}$$

- HMM3 (flyout)

$\pi = [0.99997, 0.00001, 0.00001, 0.00001]$ $$A = \begin{bmatrix} 0.09904 & 0.31947 & 0.29778 & 0.28371 \\ 0.09904 & 0.31947 & 0.29778 & 0.28371 \\ 0.09904 & 0.31947 & 0.29778 & 0.28371 \\ 0.09904 & 0.31947 & 0.29778 & 0.28371 \end{bmatrix}$$

$$B = \begin{bmatrix} 0.03428 & 0.11221 & 0.00680 & 0.024142 & 0.00001 & 0.32983 & 0.01700 & 0.00001 & 0.25843 \\ 0.00001 & 0.11619 & 0.00704 & 0.24999 & 0.00001 & 0.34154 & 0.01761 & 0.00001 & 0.26760 \\ 0.00001 & 0.11619 & 0.00704 & 0.24999 & 0.00001 & 0.34154 & 0.01761 & 0.00001 & 0.26760 \\ 0.00001 & 0.11619 & 0.00704 & 0.24999 & 0.00001 & 0.34154 & 0.01761 & 0.00001 & 0.26760 \end{bmatrix}$$

· Batter up shot

- HMM1 (BatterUp)

$\pi = [0.99997, 0.00001, 0.00001, 0.00001]$ $$A = \begin{bmatrix} 0.03629 & 0.35090 & 0.31678 & 0.29603 \\ 0.03633 & 0.35085 & 0.31678 & 0.29605 \\ 0.03633 & 0.35085 & 0.31678 & 0.29605 \\ 0.03633 & 0.35085 & 0.31678 & 0.29605 \end{bmatrix}$$

$$B = \begin{bmatrix} 0.12084 & 0.01758 & 0.00437 & 0.06154 & 0.00001 & 0.54507 & 0.00001 & 0.00001 & 0.25056 \\ 0.00001 & 0.02000 & 0.00500 & 0.07000 & 0.00001 & 0.61997 & 0.00001 & 0.00001 & 0.28499 \\ 0.00001 & 0.02000 & 0.00500 & 0.07000 & 0.00001 & 0.61998 & 0.00001 & 0.00001 & 0.28499 \\ 0.00001 & 0.02000 & 0.00500 & 0.07000 & 0.00001 & 0.61998 & 0.00001 & 0.00001 & 0.28499 \end{bmatrix}$$

[Formula 28]

- HMM2 (BatterUp)

$\pi = [0.99997, 0.00001, 0.00001, 0.00001]$ $$A = \begin{bmatrix} 0.00001 & 0.80623 & 0.15580 & 0.03795 \\ 0.00001 & 0.01250 & 0.18198 & 0.80551 \\ 0.99997 & 0.00001 & 0.00001 & 0.00001 \\ 0.99997 & 0.00001 & 0.00001 & 0.00001 \end{bmatrix}$$

$$B = \begin{bmatrix} 0.00001 & 0.00001 & 0.00001 & 0.62622 & 0.00001 & 0.37371 & 0.00001 & 0.00001 & 0.00001 \\ 0.00001 & 0.00001 & 0.01250 & 0.00001 & 0.00001 & 0.00001 & 0.13749 & 0.00001 & 0.84995 \\ 0.00001 & 0.04344 & 0.00001 & 0.00002 & 0.00001 & 0.95649 & 0.00001 & 0.00001 & 0.00001 \\ 0.00001 & 0.36237 & 0.00001 & 0.01466 & 0.00001 & 0.62291 & 0.00001 & 0.00001 & 0.00001 \end{bmatrix}$$

- HMM3 (BatterUp)

$\pi = [0.99997, 0.00001, 0.00001, 0.00001]$ $$A = \begin{bmatrix} 0.16891 & 0.28624 & 0.27599 & 0.26886 \\ 0.07878 & 0.32949 & 0.30397 & 0.28776 \\ 0.07877 & 0.32950 & 0.30397 & 0.28776 \\ 0.07877 & 0.32950 & 0.30397 & 0.28776 \end{bmatrix}$$

$$B = \begin{bmatrix} 0.04317 & 0.03948 & 0.00001 & 0.18543 & 0.00190 & 0.44588 & 0.07697 & 0.00001 & 0.20714 \\ 0.00001 & 0.04308 & 0.00001 & 0.19968 & 0.00194 & 0.47040 & 0.08646 & 0.00001 & 0.19841 \\ 0.00001 & 0.04303 & 0.00001 & 0.19924 & 0.00195 & 0.47009 & 0.08624 & 0.00001 & 0.19943 \\ 0.00001 & 0.04299 & 0.00001 & 0.19894 & 0.00195 & 0.46987 & 0.08609 & 0.00001 & 0.20014 \end{bmatrix}$$

[Formula 29]

· Player up shot

- HMM1 (PlayerUp)

$\pi = [0.99997, 0.00001, 0.00001, 0.00001]$ $$A = \begin{bmatrix} 0.49344 & 0.10656 & 0.16896 & 0.23104 \\ 0.00001 & 0.36981 & 0.32745 & 0.30273 \\ 0.00001 & 0.37038 & 0.32731 & 0.30230 \\ 0.00001 & 0.37085 & 0.32720 & 0.30194 \end{bmatrix}$$

$$B = \begin{bmatrix} 0.00001 & 0.00001 & 0.99083 & 0.00001 & 0.00001 & 0.00001 & 0.00001 & 0.00001 & 0.00910 \\ 0.00001 & 0.11903 & 0.00001 & 0.28556 & 0.00001 & 0.31808 & 0.01706 & 0.00426 & 0.25598 \\ 0.00001 & 0.11697 & 0.00001 & 0.27973 & 0.00001 & 0.31341 & 0.01670 & 0.00417 & 0.26899 \\ 0.00001 & 0.11509 & 0.00001 & 0.27465 & 0.00001 & 0.30908 & 0.01639 & 0.00410 & 0.28066 \end{bmatrix}$$

- HMM2 (PlayerUp)

$\pi = [0.99997, 0.00001, 0.00001, 0.00001]$ $$A = \begin{bmatrix} 0.49375 & 0.00892 & 0.06041 & 0.43692 \\ 0.00001 & 0.36669 & 0.32749 & 0.30582 \\ 0.00001 & 0.37613 & 0.32641 & 0.29745 \\ 0.00001 & 0.38958 & 0.32483 & 0.28558 \end{bmatrix}$$

$$B = \begin{bmatrix} 0.00001 & 0.00001 & 0.99847 & 0.00001 & 0.00001 & 0.00001 & 0.00001 & 0.00001 & 0.00146 \\ 0.00001 & 0.03913 & 0.00001 & 0.05242 & 0.00001 & 0.66840 & 0.00001 & 0.02603 & 0.21398 \\ 0.00001 & 0.03727 & 0.00001 & 0.04970 & 0.00001 & 0.63325 & 0.00001 & 0.02486 & 0.25487 \\ 0.00001 & 0.03341 & 0.00001 & 0.04425 & 0.00001 & 0.56455 & 0.00001 & 0.02233 & 0.33542 \end{bmatrix}$$

- HMM3 (PlayerUp)

$\pi = [0.99997, 0.00001, 0.00001, 0.00001]$ $$A = \begin{bmatrix} 0.49986 & 0.00001 & 0.00046 & 0.49967 \\ 0.00001 & 0.32908 & 0.31549 & 0.35542 \\ 0.00001 & 0.36652 & 0.31808 & 0.31540 \\ 0.00001 & 0.52115 & 0.31254 & 0.16630 \end{bmatrix}$$

$$B = \begin{bmatrix} 0.99992 & 0.00001 & 0.00001 & 0.00001 & 0.00001 & 0.00001 & 0.00001 & 0.00001 & 0.00001 \\ 0.00001 & 0.18056 & 0.00001 & 0.17707 & 0.00001 & 0.50566 & 0.00001 & 0.00001 & 0.13665 \\ 0.00001 & 0.15415 & 0.00001 & 0.17002 & 0.00001 & 0.45399 & 0.00001 & 0.00001 & 0.22178 \\ 0.00001 & 0.09658 & 0.00001 & 0.08418 & 0.00001 & 0.25811 & 0.00001 & 0.00001 & 0.56108 \end{bmatrix}$$

(Evaluation of Shot Identification)

An experiment was conducted with the video of baseball 1 and baseball 2 (MPEG2 data) as listed in Table 1 after preparing the HMM of each event shot.

From the experimental results as shown in the example 1, it was found that the detection result of instantaneous cut point was very excellent, whereby the process from detection of the cut point to identification of the shot was performed in a series of flow. That is, the probability outputted from each HMM constructed in Formulas 25 to 29 was computed directly for the MBT symbol string divided in shot units by the instantaneous cut point detection method. Since three HMM were prepared for each event, the computation was performed 15 times in total. As a result of computation, it was supposed that the shot was outputted from the model with the highest output probability.

The results from the above process are listed below, based on the evaluation method, particularly for the pitch shot and the known correct answer pitch shot labeled beforehand among the identified shots.

(Recognition Result)

(1) Baseball 1

TABLE 5

| Evaluation expression | CS | CD | FD | RCD | RFD | DP |
|---|---|---|---|---|---|---|
| Proposal method | 173 | 150 | 12 | 86.7% | 7.4% | 80.0% |

(2) Baseball 2

TABLE 6

| Evaluation expression | CS | CD | FD | RCD | RFD | DP |
|---|---|---|---|---|---|---|
| Proposal method | 147 | 123 | 12 | 83.7% | 8.9% | 75.5% |

(Consideration)

<Recognition Rate>

The high recognition rate of 83% or more could be obtained for both the baseball 1 and baseball 2. Thus, it can be found that the MBT symbol string transits according to a certain rule in the pitch shot, and is helpful for understanding the contents of video.

<False Recognition Rate>

In the above experiment, the HMM for batter up or player up was prepared to avoid false recognition. The false recognition could be decreased by making comparison with the output probability from the HMM.

<Recognition Performance>

The recognition performance was 75.5% and 80.0%. In view of the result of using only the macro block type, the recognition result was more excellent than the conventional complex image processing.

While in the above embodiment and the examples 1 and 2, the baseball videos are employed as one example of the moving picture compressed data for the cut point detection and shot identification, the moving picture compressed data such as succor video, sumo video, melodrama and so on, other than the baseball video can be employed.

What is claimed is:

1. A cut point detection system comprising:
    means for extracting macroblock type (MBT) information for each frame from moving picture compressed data comprising macroblocks;
    means for creating an MBT symbol string comprised of a series of MBT symbols, one for each frame, wherein each MBT symbol represents a frequency feature of specific MBTs in a frame, wherein the frequency feature indicates a frequency at which a specific MBT occurs within the extracted MBT information for each frame, appending a predetermined MBT symbol to each frame in accordance with its frequency feature in order to arrange the MBT symbols according to the frame order; and
    means for discriminating the cut point of moving picture horn an array feature of MBT symbols in said MBT symbol string.

2. The cut point detection system according to claim 1, wherein said MBT symbols include a first MBT symbol indicating that the frequency of forward predictive coded MBT is largest, and a second MBT symbol indicating that the frequency of backward predictive coded MBT is largest, and the cut point of moving picture is discriminated from an array feature of said first MBT symbol and said second MBT symbol in said MBT symbol string.

3. The cut point detection system according to claim 2, wherein said first MBT symbol indicates that the frequency of forward predictive coded MBT is largest and a total number of backward predictive coded MBT and intra-coded MBT is smaller than a predetermined threshold value.

4. The cut point detection system according to claim 2, wherein said second MBT symbol indicates that the frequency of backward predictive coded MBT is largest and a total number of forward predictive coded MBT and intra-coded MBT is smaller than a predetermined threshold value.

5. The cut point detection system according to claim 2, wherein when said two first MBT symbols are adjacent in said MBT symbol string, the cut point occurs immediately before the frame corresponding to the top MBT symbol of them.

6. The cut point detection system according to claim 2, wherein when said two second MBT symbols are adjacent in said MBT symbol string, the cut point occurs immediately after the frame corresponding to the last MBT symbol of them.

7. The cut point detection system according to claim 2, wherein when said first MBT symbol and said second MBT symbol are adjacent in frame order in said MBT symbol string, the cut point occurs between two frames corresponding to said two MBT symbols.

8. A shot identification system using the cut point detection system according to claim 1, further comprising:
    means for making a shot for an identification object between two cut points detected by said cut point detection system; and
    means for selecting and identifying said shot of identification object of which the probability is largest based on an estimation model using the MBT symbol string created by said cut point detection system.

9. The shot identification system according to claim 8, wherein said estimation model selects beforehand a specific event shot from the moving picture compressed data containing an event shot that is a shot to be identified, creating said MBT symbol string for each specific event shot, and learning said MBT symbol string as a learning object MBT symbol string for each event shot.

10. The shot identification system according to claim 8, wherein said estimation model is a hidden Markov model.

11. A cut point detection method including:
    a step of computer extracting macroblock type (MBT) information for each frame from moving picture compressed data comprising macroblocks;
    a step of computer creating an MBT symbol string comprised of a series of symbols, one for each frame, wherein each MBT symbol represents a frequency feature of specific MBTs in a frame, wherein the frequency feature indicates a frequency at which a specific MBT is occurs within the extracted MBT information for each frame, appending a predetermined MBT symbol to each frame in accordance with its frequency feature in order to arrange the MBT symbols according to the frame order; and
    a step of computer discriminating the cut point of moving picture from an array feature of MBT symbols in said MBT symbol string.

12. A non-transitory computer readable storage medium storing instructions for cut point detection, the instructions comprising functionality to:
    extract macroblock type (MBT) information, for each frame from moving picture compressed data comprising macroblocks;
    create an MBT symbol string comprised of a series of symbols, one for each frame, wherein each MBT symbol represents a frequency feature of specific MBTs in a frame, wherein the frequency feature indicates a frequency at which a specific MBT occurs within the extracted MBT information for each frame, appending a predetermined MBT symbol to each frame in accordance with its frequency feature in order to arrange the MBT symbols according to the frame order; and
    discriminate the cut point of moving picture from an array feature of MBT symbols in said MBT symbol string.

* * * * *